(12) United States Patent
Seksaria

(10) Patent No.: US 6,918,621 B2
(45) Date of Patent: Jul. 19, 2005

(54) BUMPER SYSTEM FOR A MOTOR VEHICLE

(75) Inventor: Dinesh C. Seksaria, Novi, MI (US)

(73) Assignee: Alcoa Inc., Pittsburgh, PA (US)

( * ) Notice: Subject to any disclaimer, the term of this patent is extended or adjusted under 35 U.S.C. 154(b) by 28 days.

(21) Appl. No.: 10/706,804

(22) Filed: Nov. 12, 2003

(65) Prior Publication Data

US 2005/0099027 A1    May 12, 2005

(51) Int. Cl.⁷ .............................................. B60R 19/34
(52) U.S. Cl. ...................................... 293/133; 293/102
(58) Field of Search .................... 293/102, 120, 293/132, 133, 155

(56) References Cited

U.S. PATENT DOCUMENTS

| | | | |
|---|---|---|---|
| 3,694,018 A | 9/1972 | Levering | 293/88 |
| 4,272,115 A | 6/1981 | Stock | 293/155 |
| 4,460,205 A * | 7/1984 | Glance | 293/120 |
| 4,488,745 A | 12/1984 | Stokes | 293/155 |
| 5,090,755 A * | 2/1992 | Garnweidner | 293/133 |
| 5,727,827 A * | 3/1998 | Shibuya et al. | 293/155 |
| 6,042,163 A | 3/2000 | Reiffer | 293/155 |
| 6,113,164 A | 9/2000 | Setina | 293/142 |
| 6,308,999 B1 | 10/2001 | Tan et al. | 293/109 |
| 6,334,638 B1 | 1/2002 | Yamamuro et al. | 193/133 |
| 6,338,510 B1 | 1/2002 | Kanamori et al. | 293/154 |
| 6,371,541 B1 * | 4/2002 | Pedersen | 293/132 |
| 6,485,072 B1 | 11/2002 | Werner et al. | 293/132 |
| 2002/0167183 A1 * | 11/2002 | Shimotsu et al. | 293/132 |
| 2003/0227182 A1 * | 12/2003 | Yoshida et al. | 293/102 |

* cited by examiner

*Primary Examiner*—Lori L. Coletta
(74) *Attorney, Agent, or Firm*—Gary P. Topolosky; Eckert Seamans Cherin & Mellott, LLC

(57) ABSTRACT

The bumper system is used on a motor vehicle and generally includes a bumper beam and an energy-absorbing bracket connected to the bumper beam. The bracket includes a hollow energy-absorbing body having a first end and a second end. The bracket body may be saddle-shaped between the first and second ends. The bracket body deforms during a collision involving the motor vehicle. In another embodiment, the bracket body may have a first cross sectional shape at the first end that transitions to a second cross sectional shape at the second end. The second shape may be different from the first shape, or be similar to the first shape, but be, for example, rotated about 90° from the first shape. The first shape may be elongated along a first axis and the second shape elongated along a second axis rotated about 90° from the first axis.

28 Claims, 14 Drawing Sheets

BUMPER SYSTEM FOR A MOTOR VEHICLE

BACKGROUND OF THE INVENTION

1. Field of the Invention

The present invention relates generally to bumpers for motor vehicles and, more specifically, to an energy-absorbing bumper system for a motor vehicle.

2. Description of Related Art

All motor vehicles have bumpers at the front and rear ends of the motor vehicle. Typically, the bumpers include a bumper beam, which provides protection against damage and injury in case of a collision involving the motor vehicle. The bumper beams at the front and rear ends of the motor vehicle body extend transversely with respect to the longitudinal axis of the motor vehicle body. At the front and typically rear ends of the motor vehicle body, the bumper beams are secured to a pair of rails, which connect the bumper beams to the motor vehicle body. The bumper beams are secured to the ends of the rails. The rails extend longitudinally and are spaced apart at the front and rear ends of the motor vehicle body. The bumper beams are typically connected to the rails by end brackets. It is often difficult to fit these end brackets in the space available in the vicinity of the bumper beams as well as to properly mate the end brackets with the bumper beams and rails. Generally, the end brackets used in bumpers are heavy structures that rigidly connect the bumper beams and rails. Their size and weight makes them expensive to manufacture. Additionally, the bumper beams, end brackets, and rails are typically specifically designed as a distinct system. Thus, for example, the end brackets of one type of bumper are not generally suitable for use in another bumper used on a different model of motor vehicle.

Numerous bumper systems are known in the art for connecting a bumper beam with a set of rails extending from a motor vehicle body. For example, U.S. Pat. No. 6,485,072 to Werner et al. discloses a bumper system for a motor vehicle that includes a bumper beam and an energy absorber disposed between the bumper beam and bumper fascia covering the bumper beam. The bumper beam is connected directly to the rails extending from the motor vehicle body. The connection between the bumper beam and rails is a rigid connection, for example, consisting of welds or mechanical fasteners. The energy absorber is made of a deformable material such as foam.

U.S. Pat. No. 6,338,510 to Kanamori et al. discloses a bumper system for a motor vehicle that includes pivotal end brackets for joining a bumper reinforcement member (i.e., bumper beam) to a pair of rails extending from the motor vehicle body. The bumper brackets each have a boss defining a vertical hole that receives a bolt, which connects the bumper beam to the rail. The bolt and boss arrangement establishes a pivotal connection between the bumper beam and rail. The pivotal connection between these elements allows the bumper brackets to rotate or pivot inward a given angular range toward a central longitudinal axis of the motor vehicle body for redirecting impact forces during a collision.

U.S. Pat. No. 6,334,638 to Yamamuro et al. discloses an attachment structure for connecting a bumper beam to the ends of a pair of rails in a motor vehicle. The attachment structure includes a pair of bumper stays or brackets each having an impact-absorbing member, which deforms to absorb impact energy during a collision. The bumper stays or brackets are formed as a combined unit, each incorporating the impact-absorbing member and a rigid holding member supporting the impact-absorbing member. The bumper beam is mounted directly to the impact-absorbing members.

U.S. Pat. No. 6,113,164 to Setina discloses an auxiliary push bumper for a motor vehicle. The push bumper is clamped to the original bumper by brackets attached to bumper guards on the push bumper. The push bumper is made of a plurality of sections made of extruded aluminum that are attached removably to the bumper guards for easy repair and maintenance. The auxiliary push bumper is specifically adapted for use on police vehicles and the like.

U.S. Pat. No. 6,042,163 to Reiffer discloses a motor vehicle bumper having a bumper beam. The bumper beam is connected to the rails of the motor vehicle body by one-piece end brackets. The end brackets are attached and fit over opposing ends of the bumper beam. The end brackets are tubular and include overlapping flanges that allow the end brackets to be adjusted to the ends of the bumper beam. Stays are welded to and extend from the end brackets for attaching the end brackets to the rails of the motor vehicle body.

U.S. Pat. No. 4,488,745 to Stokes discloses a plastic support for attaching a plastic bumper to the metal frame of a motor vehicle body. The plastic support is comprised of a metal pad having an attachment device for attaching the metal pad to the metal frame of the motor vehicle body. The metal pad is embedded in a molded plastic matrix except where the metal pad is to be attached to the frame of the motor vehicle body.

U.S. Pat. No. 4,272,115 to Stock discloses a bumper system for a motor vehicle that includes a movable bumper beam. The bumper system has a superposed polyurethane molding covering the bumper beam. The bumper beam is comprised of a center metal section and two side metal sections, which are connected by spring-pivotal radius arms to the motor vehicle body. In the event of an impact involving the motor vehicle, the side sections pivot away from the motor vehicle body on their respective radius arms against the action of the associated springs to accommodate and redirect the impact force.

U.S. Pat. No. 3,694,018 to Levering discloses an elastomeric impact bumper assembly or system for dissipating energy during a collision. The bumper assembly includes a bumper beam that is connected to the rails of a motor vehicle body by elastomeric, impact energy dissipating bodies. The energy dissipating bodies are made of high-density polyurethane and have a generally rectangular, tubular configuration adapted to buckle under impact compression. The energy dissipating bodies are adapted to return to their original shape following the release of the impact energy.

Typically, the bumper systems described hereinabove include curved bumper beams for stylistic and aerodynamic considerations. Since these current bumper beams curve in one direction, considerable damage often occurs when the bumper system engages a body having an oppositely curved configuration, such as a telephone pole. In such a collision, the bumper beam and pole are curved in opposite orientations. This results in a line-contact impact, so that the impact force is localized along a line on the bumper beam. In current bumper systems, this situation is addressed by the use of load-spreading brackets which are added to the center of the bumper beam. Currently available designs known in the art are heavy and perform rather inefficiently, as well as being rather expensive to manufacture and attach to the bumper beam.

BRIEF SUMMARY OF THE INVENTION

As may be seen from the foregoing, numerous arrangements and configurations are known in the art for connecting a bumper beam to the rails of a motor vehicle body. Often, these bumper systems include an energy-absorbing or accommodating component to redirect or absorb impact energy in the event of a collision. However, a need exists for a bumper system for use on a motor vehicle body in which the bumper beam, brackets, and frame rails work synergistically. In addition, there is a need for end brackets that may be adapted to a family of bumper beams and frame rails in a motor vehicle body. Additionally, there is a need for end brackets that are lighter than current end brackets used in the art, but are easier to manufacture and install, thereby reducing manufacturing and installation costs. Further, a need exists for a more efficient mechanism to counteract line-contact impact situations involving a curved bumper beam and an oppositely curved structure, such as a telephone or utility pole.

The present invention provides a bumper system and method of assembling and attaching the same to a motor vehicle body that meets each of the foregoing needs. The bumper system may be connected to the front or rear ends of a motor vehicle body. The bumper system of the present invention generally comprises a bumper beam and an energy-absorbing bracket connected to the bumper beam and adapted for connection to the motor vehicle, preferably a frame rail extending from the body of the motor vehicle. The bumper system may include two brackets for connection to a pair of frame rails which is a common frame rail configuration known in the art. The bracket generally comprises a hollow energy-absorbing body having a first end and a second end. The bracket body may define a saddle shape between the first and second ends. The bracket body is generally adapted to deform during a collision involving the motor vehicle. The bumper beam and bracket may each be formed of aluminum; steel, or be formed of different materials such as aluminum and steel.

A pair of opposing flanges may extend from the first end of the bracket body and define a mouth opening receiving the bumper beam. A pair of opposing flanges may also extend from the second end of the bracket body and define a mouth opening configured to receive a frame rail of the motor vehicle.

The bumper beam may have a generally Σ-shaped cross section defined by substantially parallel top and bottom walls connected by a rear wall. The generally Σ-shaped cross section may be at least partially filled with an impact-absorbing foam material.

A pole impact protector may be connected to the bumper beam on an opposite side of the bumper beam from the bracket. The pole impact protector may comprise a hollow body defining an outward facing substantially concave surface adapted to accommodate impact energy resulting from a collision with a cylindrical object. The pole impact protector body may be at least partially filled with an impact-absorbing foam material. The pole impact protector body may be formed of aluminum.

In another embodiment, the bumper system comprises a bumper beam and an energy-absorbing bracket connected to the bumper beam and adapted for connection to the motor vehicle. The bracket comprises a hollow energy-absorbing body having a generally tubular form with a first end and a second end. The hollow energy-absorbing body has a first cross sectional shape at the first end which transitions to a second cross sectional shape at the second end.

The second cross sectional shape may be different from the first cross sectional shape. Additionally, the first cross sectional shape may be substantially identical to the second cross sectional shape, with the second cross sectional shape rotated about 90° from the first cross sectional shape. The first cross sectional shape may be elongated along a first axis and the second cross sectional shape may be elongated along a second axis, with the second axis rotated about 90° from the first axis. Further, the first and second cross sectional shapes may be substantially oval, with the second cross sectional shape rotated about 90° from the first cross sectional shape.

A pair of opposing flanges may extend from the first end of the bracket body and define a mouth opening receiving the bumper beam. The bumper beam and bracket may each be formed of aluminum or steel. Alternatively, the bumper beam and bracket may be formed of different materials, such as aluminum and steel.

The bumper beam may have a generally Σ-shaped cross section defined by substantially parallel top and bottom walls connected by a rear wall. The generally Σ-shaped cross section may be at least partially filled with an impact-absorbing foam material.

A pole impact protector may be connected to the bumper beam on an opposite side of the bumper beam from the bracket. The pole impact protector may comprise a hollow body defining an outward facing substantially concave surface adapted to accommodate impact energy resulting from a collision with a cylindrical object. The pole impact protector body may be at least partially filled with an impact-absorbing foam material. The pole impact protector body may be formed of aluminum or steel.

The present invention is further directed to an energy-absorbing bracket for use in the bumper system. The bracket generally includes a hollow energy-absorbing body having a first end and a second end. The bracket body may define a saddle shape between the first and second ends adapted to deform during a collision involving the motor vehicle. The bracket may further comprise opposing flanges extending from each of the first and second ends of the bracket body. The flanges may define mouth openings adapted to receive a bumper beam and a frame rail of a motor vehicle, respectively. The bracket body may be formed of aluminum or steel.

In another embodiment, the bracket body may have a first cross sectional shape at the first end that transitions to a second cross sectional shape at the second end for accommodating impact energy during a collision involving the motor vehicle. The second cross sectional shape may differ from the first cross sectional shape. The first and second cross sectional shapes may be substantially identical, with the second cross sectional shape rotated about 90° from the first cross sectional shape. Additionally, the first cross sectional shape may be elongated along a first axis and the second cross sectional shape may be elongated along a second axis, with the second axis rotated about 90° from the first axis. Preferably, the first and second cross sectional shapes are substantially oval-shaped, with the second cross sectional shape rotated about 90° from the first cross sectional shape. The bracket may further comprise opposing flanges extending from the first end of the bracket body. The opposing flanges define a mouth opening adapted to receive a bumper beam of the motor vehicle.

Additionally, the present invention is directed to a pole impact protector for use in a bumper system of a motor vehicle. The pole impact protector is generally comprised of a hollow body having a closed end defining an outward facing substantially concave surface, which is adapted to accommodate impact energy resulting from a collision with a cylindrical object. The pole impact protector body preferably comprises an open end opposite the closed end and opposing flanges extending from the open end for mounting the pole impact protector to the bumper system. The pole impact protector body may be at least partially filled with an impact-absorbing foam material. Moreover, the pole impact protector body may be formed of aluminum or steel.

Further, the present invention is directed to a method of assembling and attaching a bumper system to a motor vehicle. The method generally includes providing an energy-absorbing bracket comprising a hollow energy-absorbing body having a first end and a second end, the bracket body defining a saddle shape between the first and second ends, the bracket body further comprising opposing flanges at least at the first end of the bracket body, the opposing flanges defining a mouth opening, and receiving and securing a bumper beam in the mouth opening at the first end of bracket body.

The method may further comprise attaching the second end of the bracket body to the motor vehicle. Additionally, the method may comprise attaching a pole impact protector to the bumper beam on an opposite side of the bumper beam from the bracket. The pole impact protector generally comprises a hollow body having a closed end and open end and opposing flanges extending from the open end. The step of attaching the pole impact protector to the bumper beam may comprise receiving the bumper beam between the opposing flanges of the pole impact protector body and securing the flanges to the bumper beam.

In an alternative embodiment of the method of the present invention, the method includes providing an energy-absorbing bracket comprising a hollow energy-absorbing body having a generally tubular form with a first end and a second end, the hollow energy-absorbing body having a first cross sectional shape at the first end and transitioning to a second cross sectional shape at the second end, the bracket body further comprising opposing flanges at least at the first end of the bracket body, the opposing flanges defining a mouth opening, and receiving and securing a bumper beam in the mouth opening at the first end of the bracket body. The method may further comprise attaching the second end of the bracket body to the motor vehicle.

Further details and advantages of the present invention will become apparent from the following detailed description when read in conjunction with the drawings wherein like parts are designated with like, primed reference numbers throughout.

DETAILED DESCRIPTION OF THE INVENTION

Figure 1:
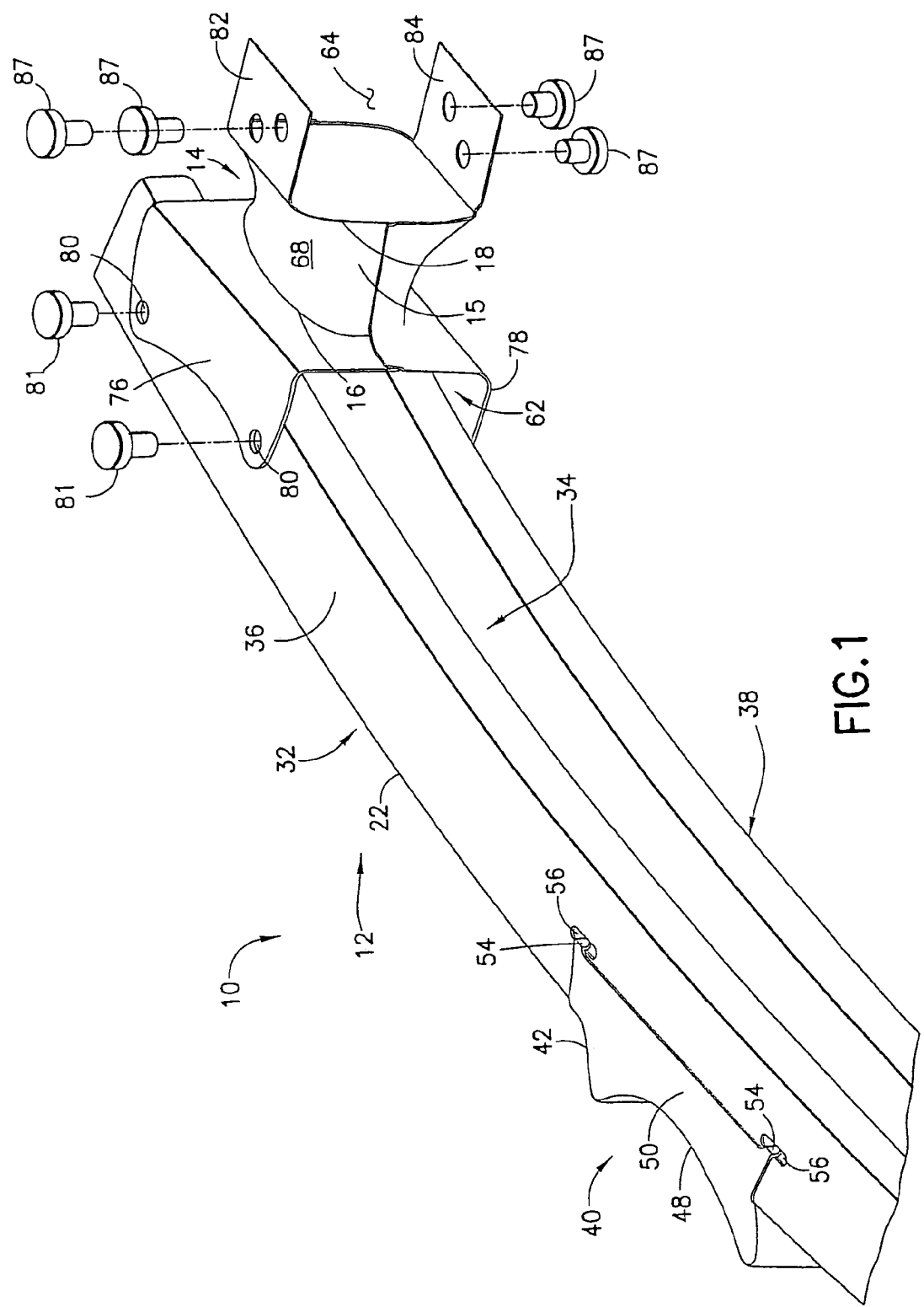
FIG. 1 is a perspective view of a bumper system in accordance with the present invention, comprising a bumper beam, an end bracket, and an optional pole impact protector.

For purposes of the description hereinafter, the terms "upper", "lower", "right", "left", "vertical", "horizontal", "top", "bottom", and derivatives thereof shall relate to the invention, as it is oriented in the drawing figures. However, it is to be understood that the invention may assume many alternative variations and step sequences except where expressly specified to the contrary. It is also to be understood that the specific devices and processes illustrated in the attached drawings and described in the following text are simply exemplary embodiments of the invention. Hence, specific dimensions and other physical characteristics related to the embodiments disclosed hereinafter are not to be considered limiting.

Figure 2:
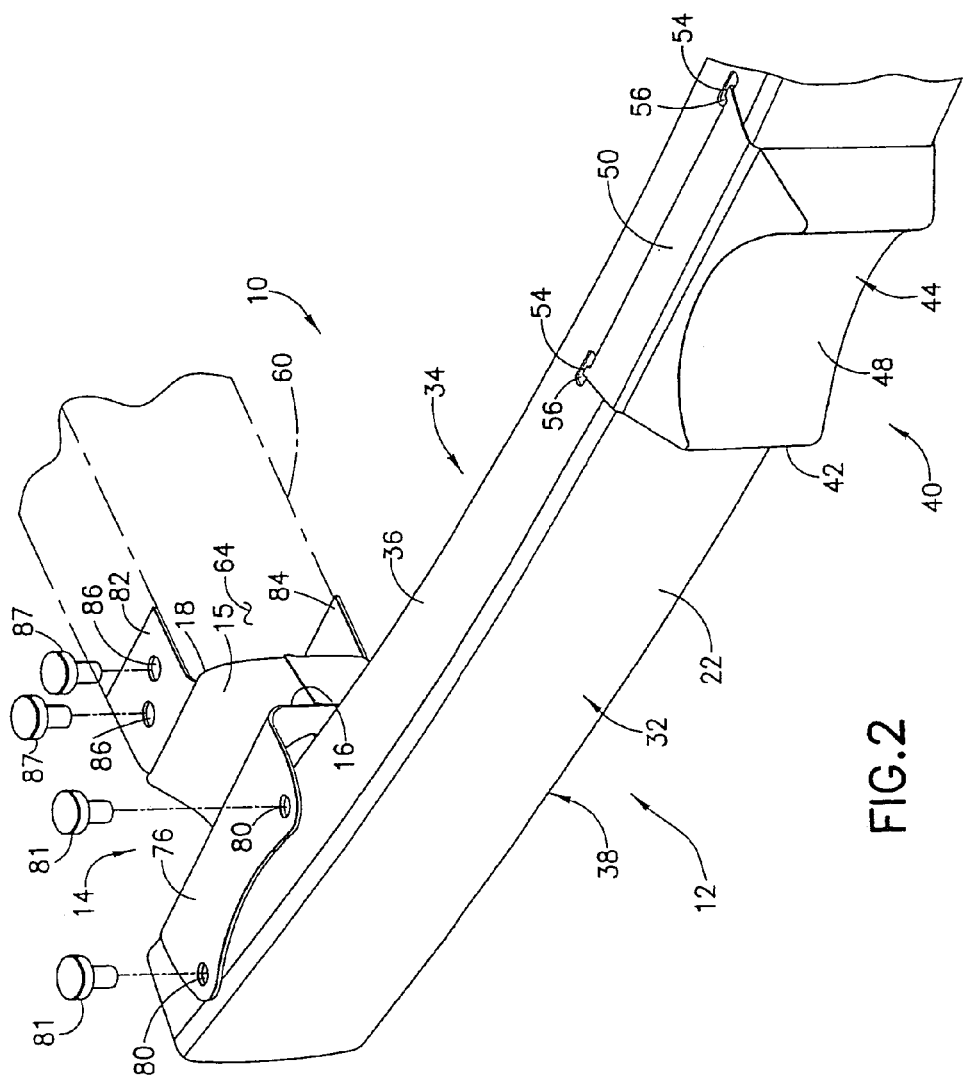
FIG. 2 is a front perspective view of the bumper system of FIG. 1.
Figure 3:
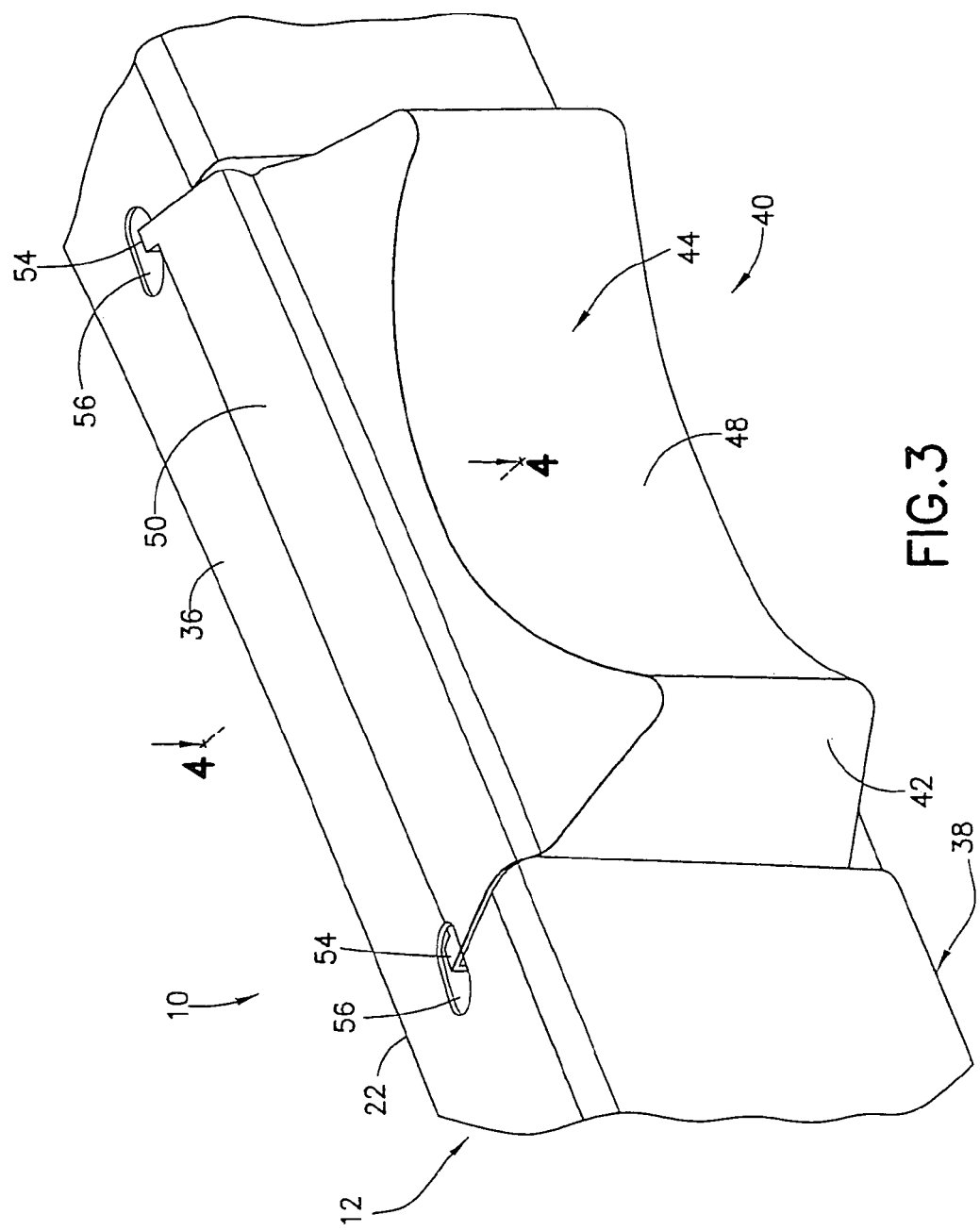
FIG. 3 is a front perspective view of the bumper beam and pole impact protector of FIG. 1.

Referring to FIGS. 1 and 2, a bumper system 10 for a motor vehicle is shown. The bumper system 10 may be provided at the front and/or rear end of a motor vehicle body (not shown). The bumper system 10 is generally comprised of an elongated, preferably curved bumper beam 12 and at least one and, more preferably, a pair of end brackets 14 connected to the bumper beam 12. The end brackets 14 each have a body 15 (hereinafter "bracket body 15") with a first end 16 and a second end 18. The first end 16 of the bracket body 15 is preferably configured for connection to the bumper beam 12. Likewise, the second end 18 of the bracket body 15 is preferably adapted/configured for connection to a pair of frame rails extending from the front or rear end of the motor vehicle body.

As is conventional in the art, the bumper beam 12 generally extends transversely across the motor vehicle body. The use of two, spaced-apart frame rails at the front and rear ends of a motor vehicle body is well known and conventional in the art. In FIGS. 1 and 2, only one end bracket 14 is shown. It will be apparent to those skilled in the art that a second end bracket 14 is provided at the other end of the bumper beam 12. The following discussion is with respect to one end bracket 14 that is connected to the bumper beam 12 and configured for connection to a frame rail extending from the motor vehicle body and is applicable to the preferred embodiment of the bumper system 10 of the present invention having two end brackets 14 located substantially at opposite ends of the bumper beam 12.

Referring to FIGS. 1–4, the bumper beam 12 is preferably a multi-material hybrid bumper beam 12, such as that disclosed in U.S. Pat. No. 6,308,999 to Tan et al., which is incorporated fully herein by reference. The bumper beam 12 has a generally Σ-shaped cross section 20 defined by a generally Σ-shaped elongated body 22 (hereinafter "bumper beam body 22") that may formed as an extrusion, for example aluminum extrusion, or formed from metal sheet, preferably aluminum sheet. The bumper beam body 22 includes a rear wall 24 that is connected to substantially parallel top and bottom walls or sides 26, 28, which together form the Σ-shaped cross section 20 of the bumper beam body 22. The bumper beam body 22 has an open end or face 30 opposite the rear wall 24. The open, Σ-shaped cross section 20 of the bumper beam body 22 is at least partially, but preferably fully filled, with a compressible, impact-absorbing foam material 31, which cushions the bumper beam 12 in the event of a collision involving the bumper system 10. As shown in FIGS. 1 and 2, the bumper beam body 22 has a generally curved shape, with a convex side 32 of the bumper beam body 22 preferably forming the outward or externally facing side of the bumper beam 12, and a concave side 34 preferably forming the motor vehicle body facing side of the bumper beam 12. Additionally, the bumper beam body 22 has a top or upper side 36 and a bottom or underside 38.

Referring to FIGS. 1–6, the bumper system 10 preferably further includes a pole impact protector 40 connected to the bumper beam 12 opposite the end brackets 14. The pole impact protector 40 is generally attached to the convex side 32 of the bumper beam body 22. The pole impact protector 40 is comprised of a pole impact protector body 42, which is preferably a unitary body, having a closed end 44 and an open end 46. The closed end 44 of the pole impact protector body 42 defines a concave outer surface or recess 48, which is formed to conform to the cylindrical shape of a cylindrical object, such as a telephone or utility pole. The concave or cylindrical form of the recess 48 is formed to distribute the load of an impact involving the bumper beam 12 and a cylindrical object such as a pole, which avoids the line-contact impact situation discussed previously. As discussed previously, an impact situation involving the bumper beam 12 and an oppositely curved object, such as a pole, results in a line-contact impact situation which concentrates force at substantially along line on the bumper beam body 22. The curved form of the recess 48 distributes this impact load on the bumper beam body 22 and prevents the line-contact situation.

The pole impact protector body 42 further comprises top and bottom flanges 50, 52 extending from the open end 46. The flanges 50, 52 each have at least one and, more preferably, two tangs 54 for attaching the pole impact protector body 42 to the bumper beam 12. In particular, the tangs 54 are bent and inserted into top and bottom openings or slots 56, 58 formed in the top and bottom walls or sides 26, 28 of the bumper beam body 22. The use of the tangs 54 and the corresponding openings or slots 56, 58 provides an easy method for attaching the pole impact protector body 42 to the convex side 32 of the bumper beam body 22. No mechanical fasteners or welds are required to maintain the connection between the pole impact protector body 42 and bumper beam body 22. However, such attachment methods may be used to fixedly attach the flanges 50, 52 to the bumper beam body 22 and, particularly to fixedly attach the flanges 50, 52 to the top and bottom walls 26, 28 of the bumper beam body 22. When attached to the bumper beam 12, an impact load applied to the pole impact protector 40 will be transmitted and absorbed through compression of the impact-absorbing foam material 31 in the pole impact protector body 42 of the pole impact protector 40 and in the Σ-shaped cross section 20 of the bumper beam body 22 of the bumper beam 12, and through metal-to-metal contact between the pole impact protector body 42 and the bumper beam body 22.

Figure 4:
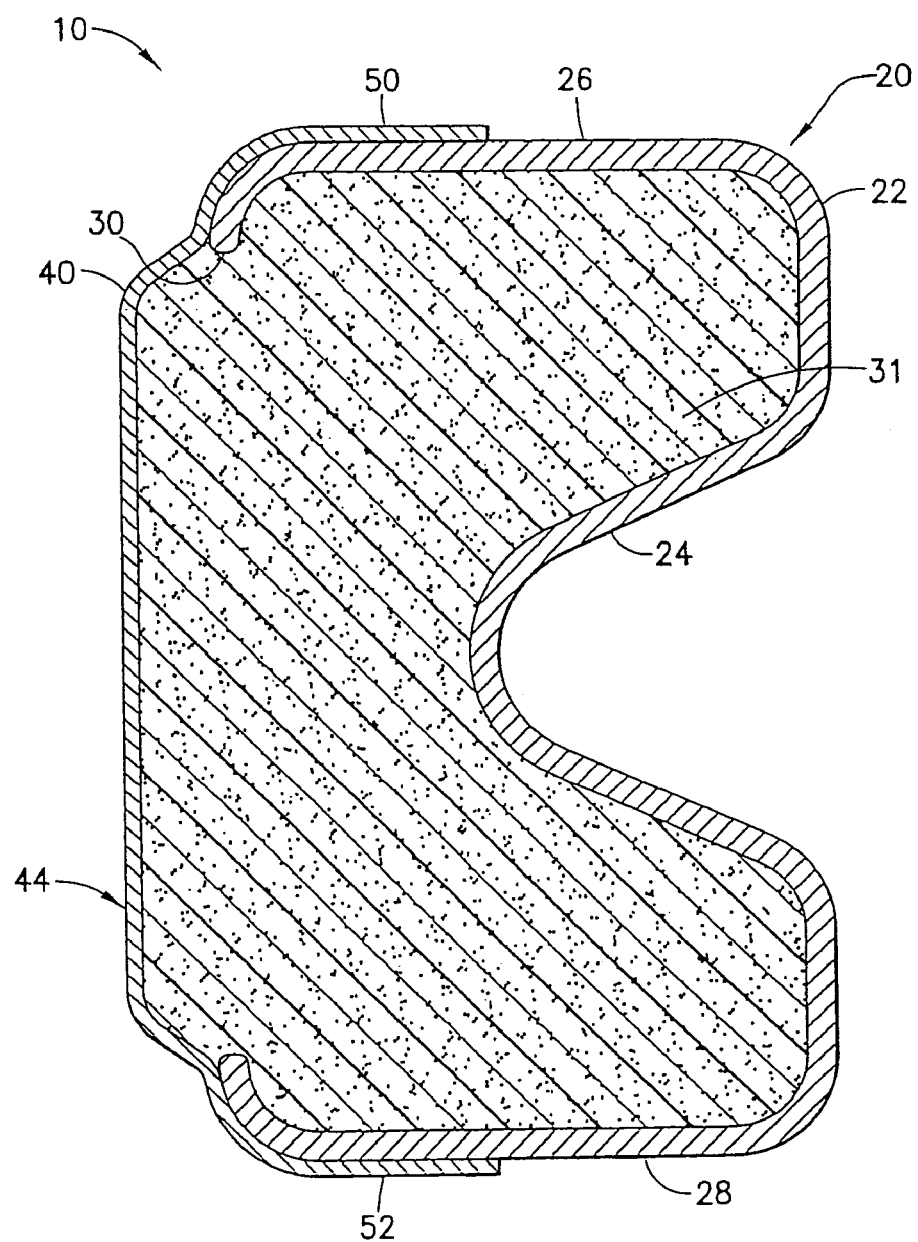
FIG. 4 is a cross sectional view taken along line 4—4 in FIG. 3.
Figure 5A:
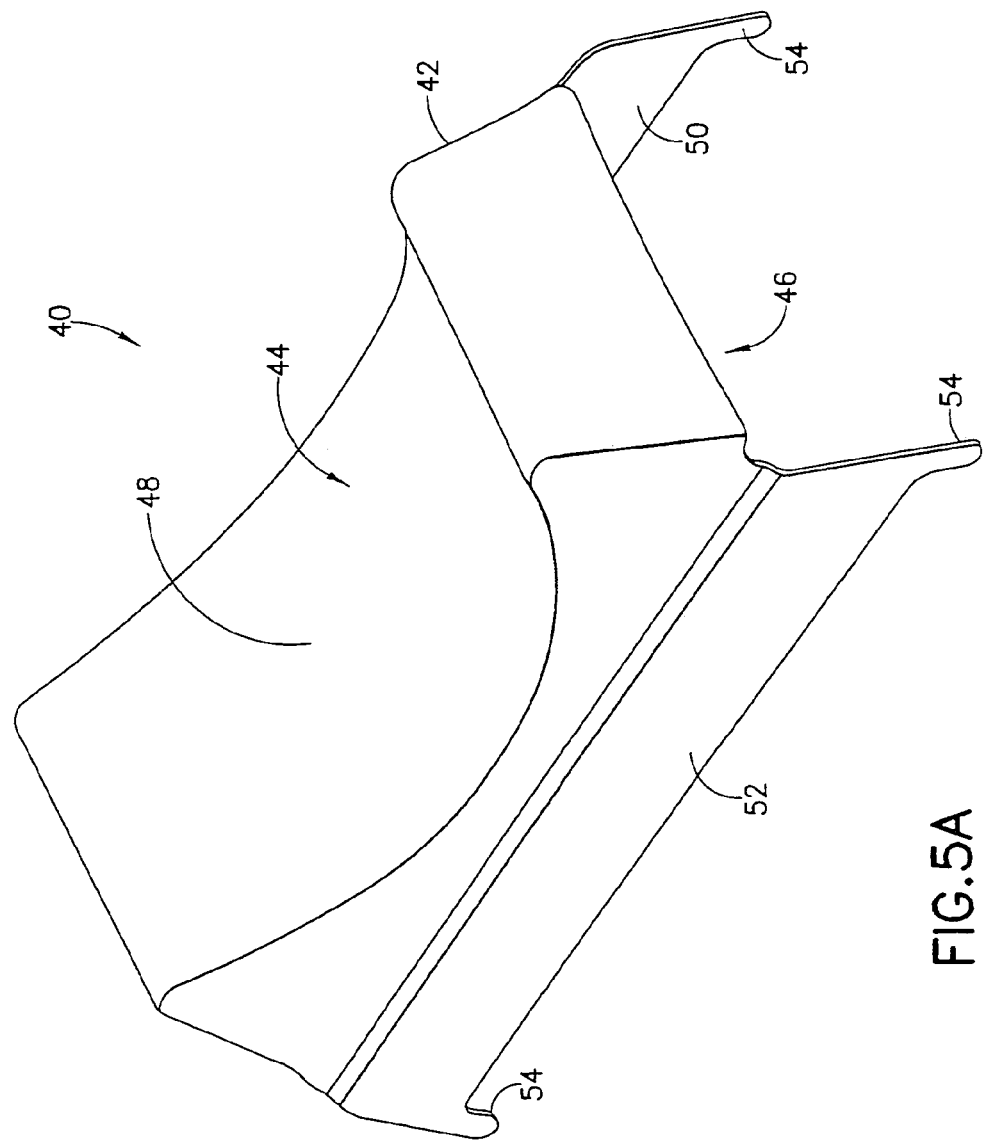
FIG. 5A is a top perspective view of the pole impact protector of FIG. 1, shown detached from the bumper beam.
Figure 5B:
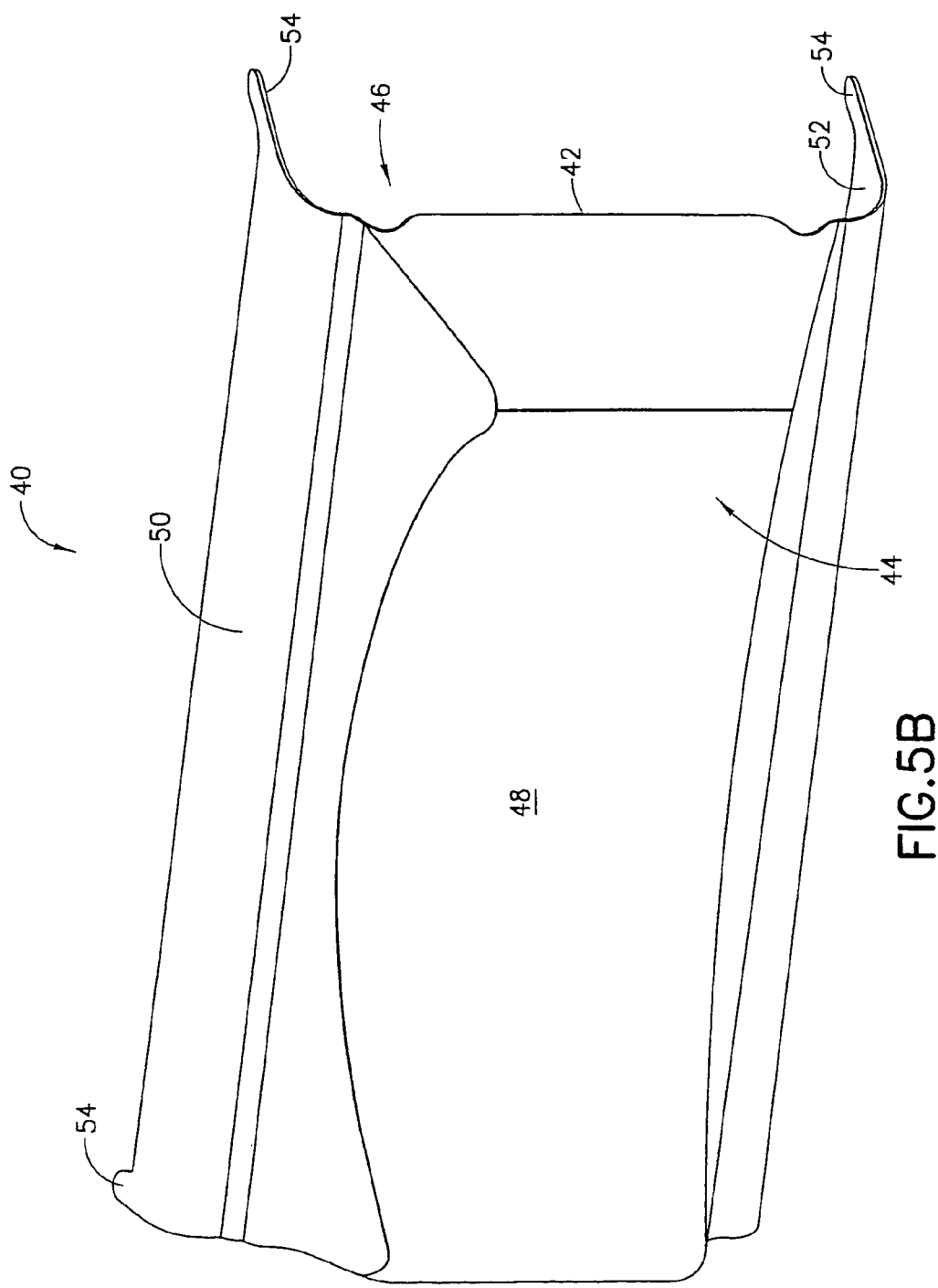
FIG. 5B is a front perspective view of the pole impact protector of FIG. 5.

As shown in FIG. 4, the pole impact protector body 42 is preferably filled with the same impact-absorbing-foam material 31 used to fill the open cross section 20 of the bumper beam body 22. For example, once the pole impact protector 40 is attached to the bumper beam 12, a foam-fill machine, which is standard in the art, may be used to fill the open cross section 20 of the bumper beam body 22 and the pole impact protector body 42. The impact-absorbing foam material 31 may be polyurethane, polypropylene, polyethylene, and like materials, which are standard impact-absorbing materials known in the art. These materials bond to the internal surfaces in the open cross section 20 of the bumper beam body 22 and the pole impact protector body 42.

The pole impact protector body 42 may be stamped from metal such as steel or may be cast from a lighter weight material such as aluminum. As stated previously, the bumper beam body 22 may be formed as an aluminum extrusion or formed from metal sheet such as aluminum sheet. However, the bumper beam body 22 may be formed from heavier materials, such as steel. For example, the bumper beam body 22 may be formed from steel sheet that is stamped or bent into the Σ-shaped cross section 20.

Figure 6:
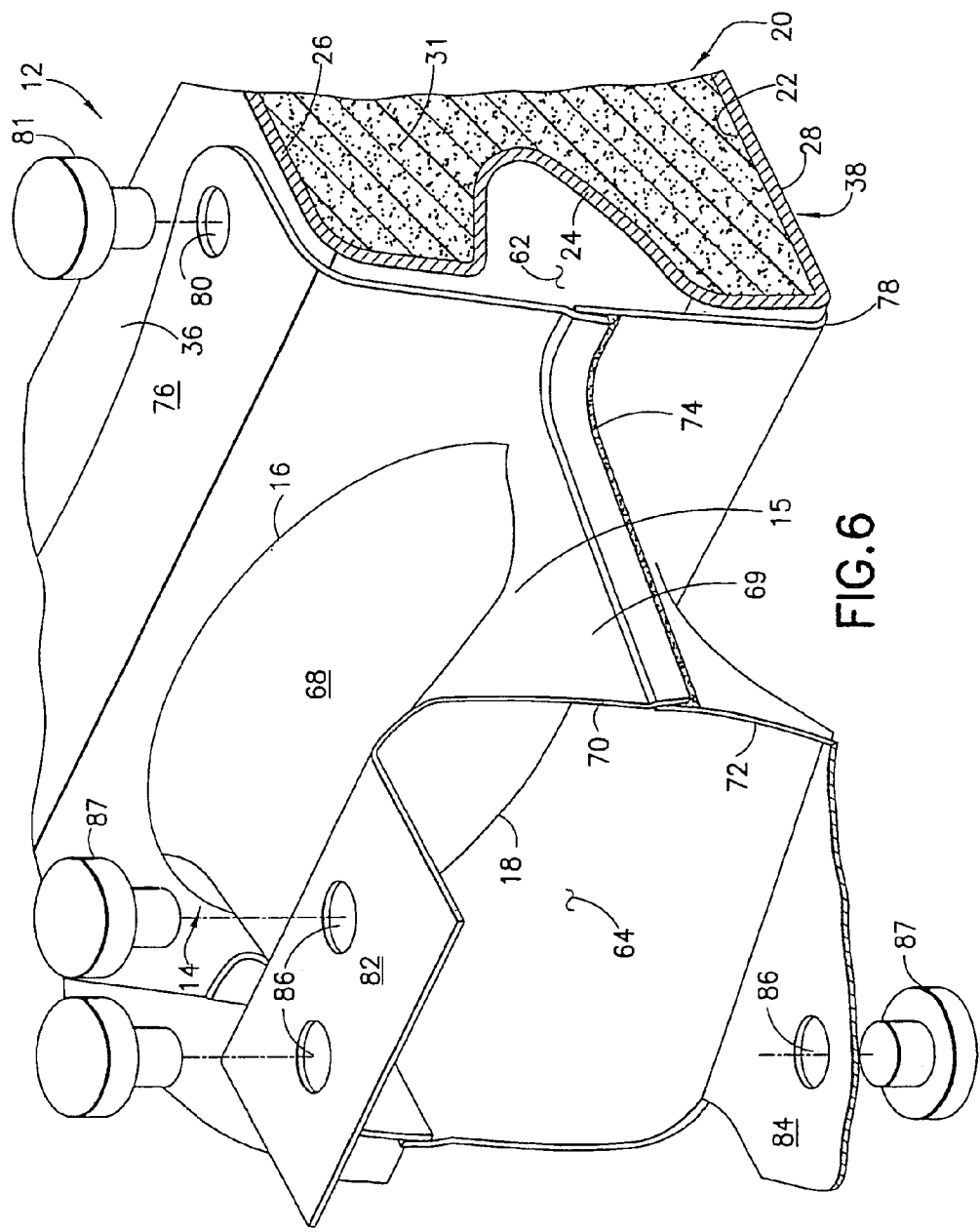
FIG. 6 is a perspective view of the connection between the bumper beam and end bracket in the bumper system of FIG. 1.
Figure 7:
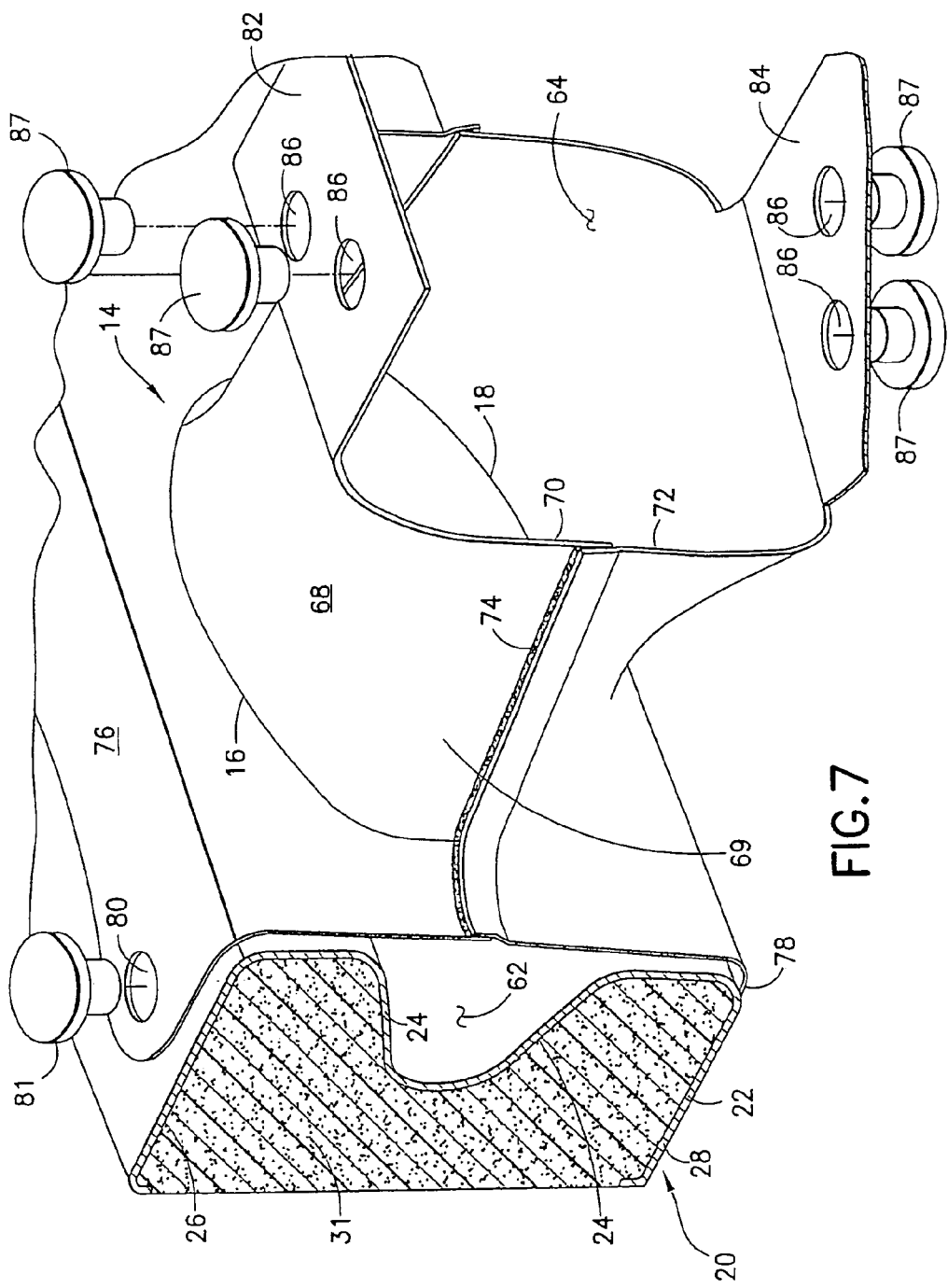
FIG. 7 is a top perspective view of the connection between the bumper beam and end bracket at the opposite end of the bumper beam in the bumper system of FIG. 1.
Figure 8:
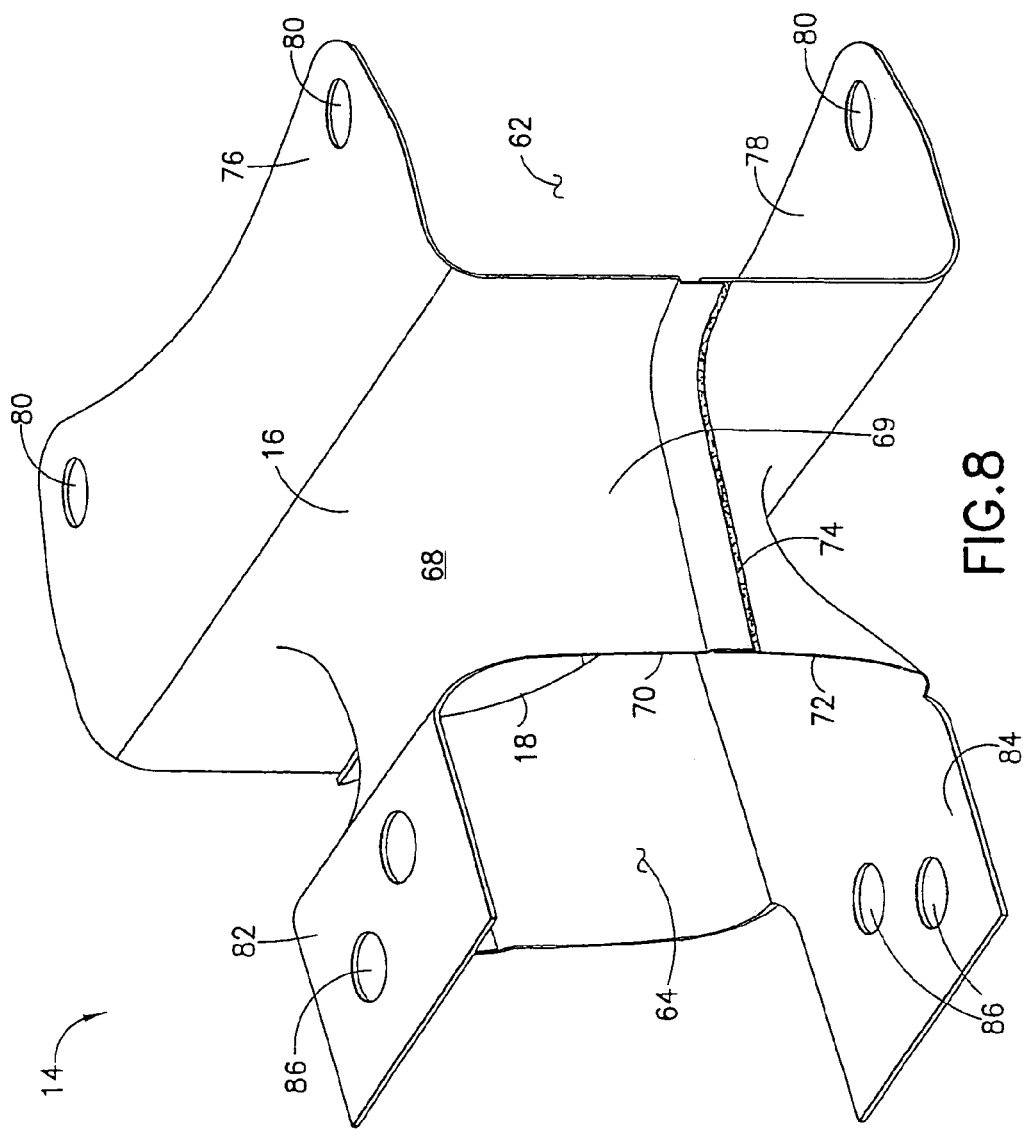
FIG. 8 is a front perspective view of the end bracket of FIG. 1, shown detached from the bumper beam.
Figure 9:
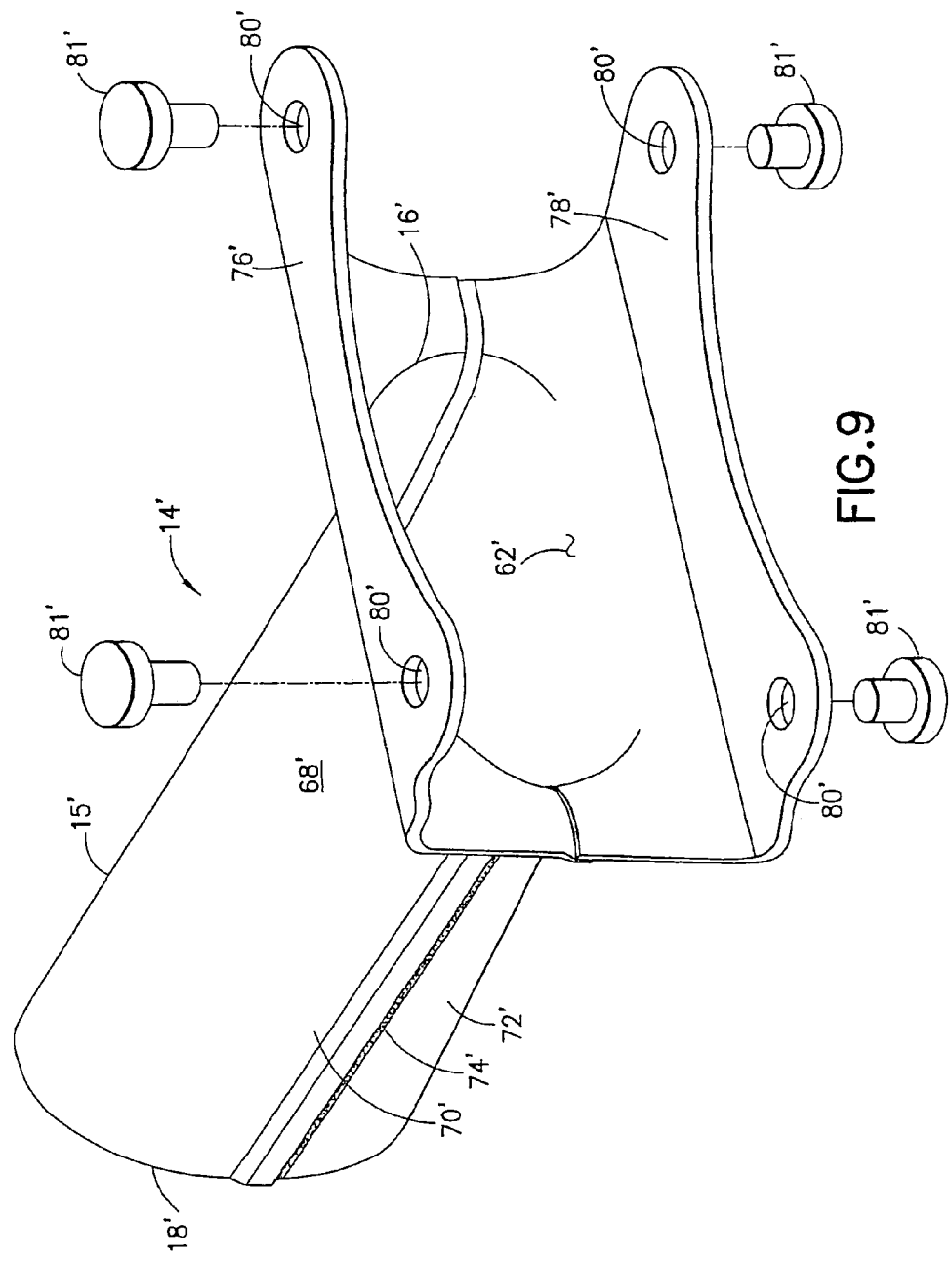
FIG. 9 is a perspective view of another embodiment of the end bracket, which may be used in the bumper system of FIG. 1.
Figure 10:
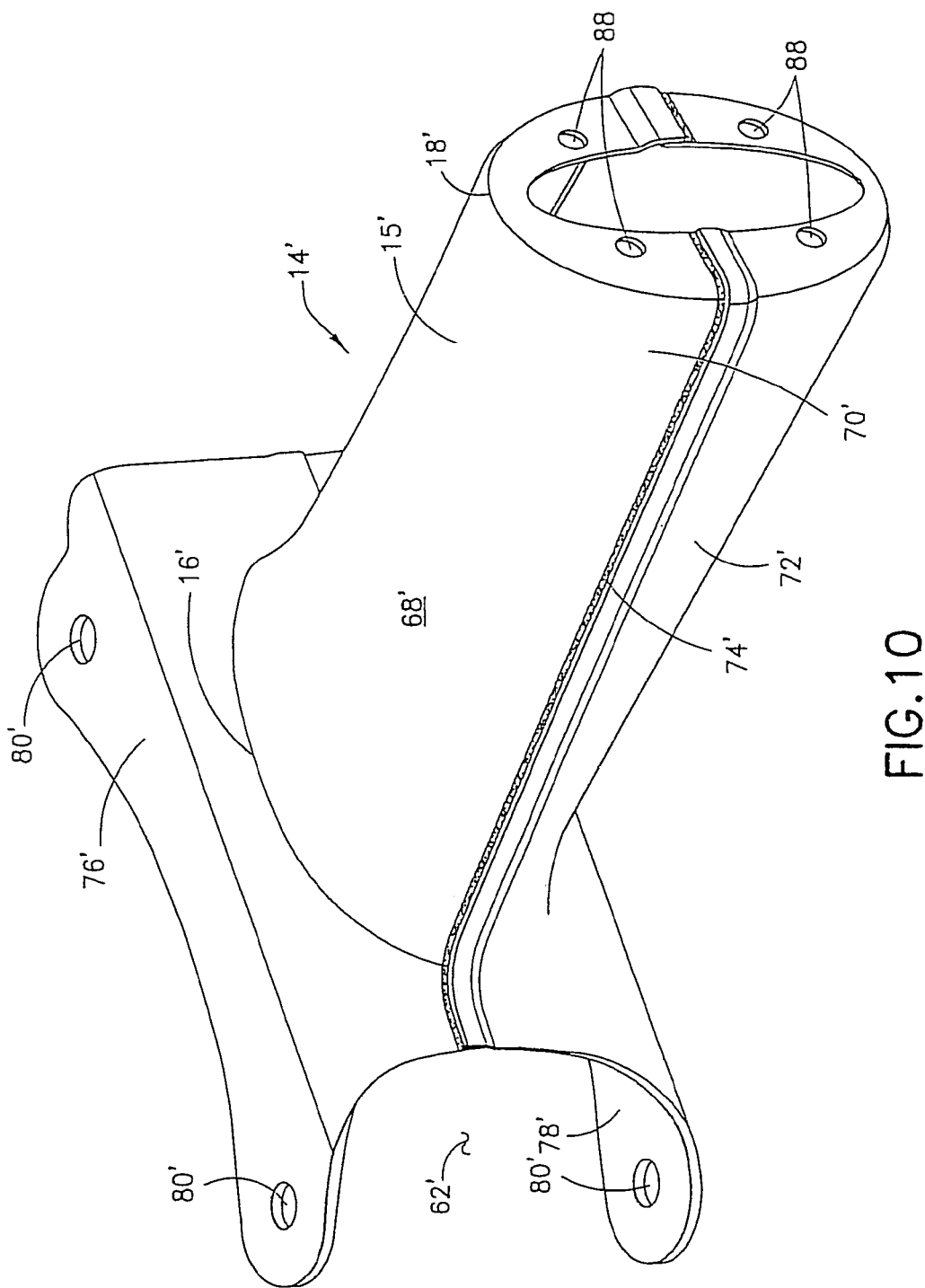
FIG. 10 is a rear perspective view of the end bracket of FIG. 9.
Figure 11:
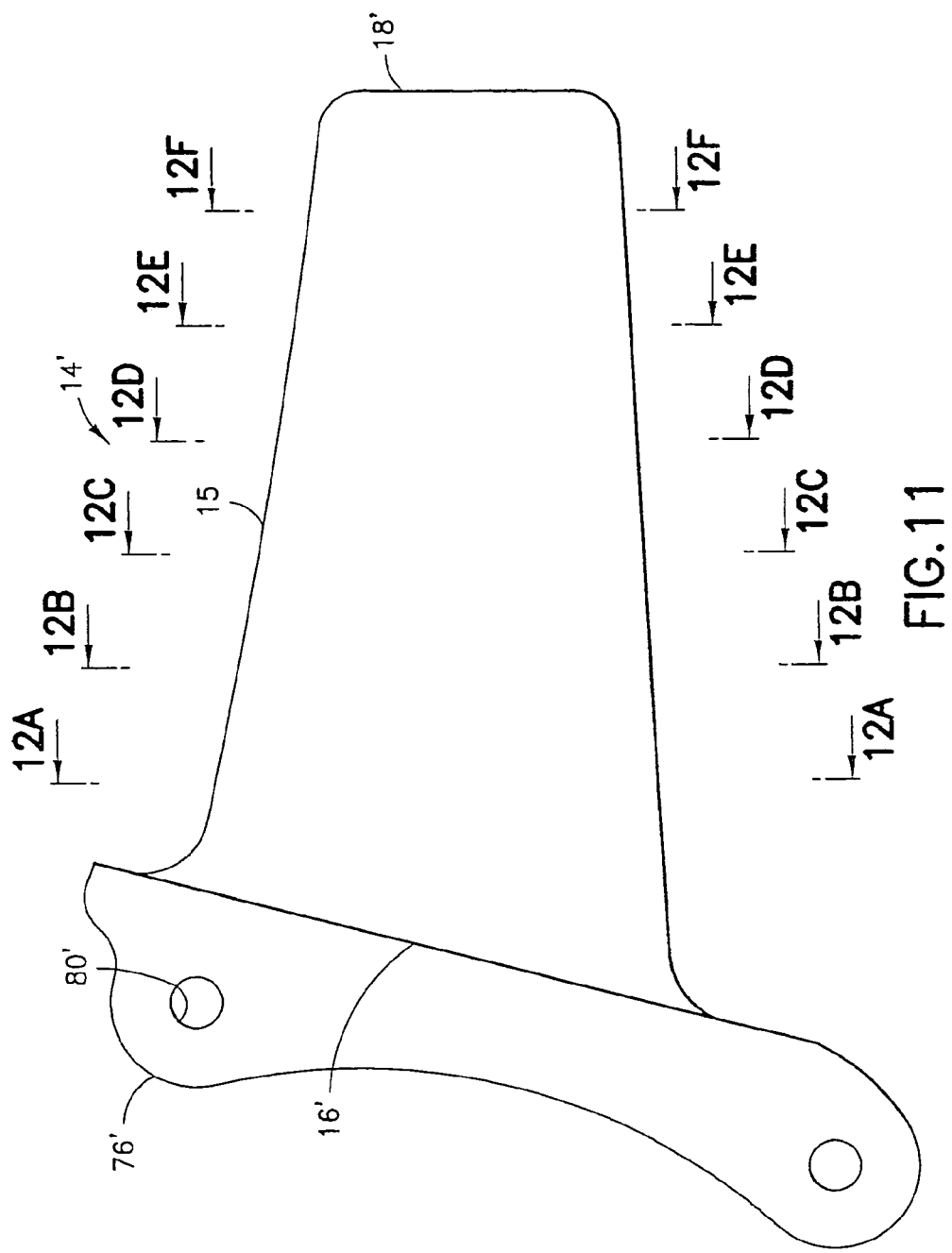
FIG. 11 is a top view of the end bracket of FIG. 9.

As indicated previously, the bumper system 10 of the present invention includes the bumper beam 12 and two end brackets 14 adapted to connect the bumper beam 12 with a pair of frame rails 60 extending from a motor vehicle body, one of which is shown in FIG. 2. Referring further to FIGS. 6–8, one of the end brackets 14 according to a first embodiment is shown in greater detail. The first end 16 of the bracket body 15 has a generally C-shaped configuration defining a first mouth opening 62 for receiving the bumper beam 12. The second end 18 of the end bracket body 14 is also generally C-shaped and defines a second mouth opening 64 for receiving the frame rail 60, as shown in FIG. 2.

As indicated previously, the bracket body 15 is a generally hollow, energy-absorbing structure. In particular, the bracket body 15 exhibits a general saddle shape between the first and second ends 16, 18, which is adapted to accommodate impact energy resulting from a collision involving the bumper system 10. The bracket body 15 has an outer surface 68 defining a generally concave or recessed shape that tapers downward to form depending lateral sides 69 of the bracket body 15. The curved outer surface 68 and depending lateral sides 69 generally form the "saddle" shape of the bracket body 15. The general "saddle" shape of the bracket body 15 is generally adapted to deform or buckle in case of a collision involving the bumper system 10. In particular, the "saddle" shape of bracket body 15 participates with the bumper beam 12 and the impact-absorbing foam material 31 within the bumper beam 12 to provide an integrated system which accommodates impact energy in event of a collision involving a motor vehicle having the bumper system 10. The "saddle" shape exhibits energy-absorbing characteristics due its concave shape and depending sides. The saddle-shaped bracket body 15 deforms axially (i.e., compresses) during a collision to absorb the impact energy associated with the collision due to its "saddle" shape. However, as indicated, the saddle-shaped bracket body 15 is just one energy-absorbing component of the bumper system 10. The bumper beam 12, impact-absorbing foam material 31, and, optionally, the pole impact protector 40 are other components of the integrated system for absorbing impact energy when the bumper system 10 is involved in a collision and play a role in absorbing impact energy in the collision.

The bracket body 15 is preferably formed by a complementary first or top bracket component 70 and a second or bottom bracket component 72. The first and second bracket components 70, 72 are preferably stamped from metal sheet, such as steel, or may be formed of aluminum. The first and second bracket components 70, 72 are joined along longitudinal edges, for example by a weld 74, to form the end bracket 14. The first and second bracket components 70, 72 may also be joined by mechanical fasteners, or other equivalent means. The bracket body 15 may also be formed as a unitary body instead of being formed by the first and second bracket components 70, 72, such as a cast aluminum or steel unitary body. The bracket body 15 is preferably a generally hollow structure, but the bracket body 15 may also be filled with impact-absorbing foam material (not shown), such as the impact-absorbing foam material 31 discussed previously. The first and second bracket components 70, 72 are preferably each formed to have the concave outer shape or surface 68 and depending lateral sides 69 so that, when joined, the first and second bracket components 70, 72 form a symmetric bracket body 15 that exhibits the "saddle" shape when viewed from the top or bottom, as depicted in FIGS. 6–8. Additionally, the bracket body 15 may be formed of individual extruded pieces which are joined to form the bracket body 15. Such extruded pieces are preferably extruded aluminum pieces.

The first end 16 of the bracket body 15 preferably includes a pair of upper and lower flanges 76, 78, which define the first mouth opening 62 that receives the bumper beam 12, as shown in FIGS. 1, 2 and 6, 7. The flanges 76, 78 cooperate with the top and bottom walls or sides 26, 28 of the bumper beam body 22, which generally forms the bumper beam 12. Preferably, the flanges 76, 78 define a plurality of openings 80 for receiving mechanical fasteners 81 that extend into openings (not shown) in the top and bottom walls or sides 26, 28 of the bumper beam body 22 to secure the bumper beam 12 to the end brackets 14. The rear wall 24 of the bumper beam body 22 is substantially received in the mouth opening 62, as shown in FIGS. 6 and 7, for example. The mechanical connection between the bumper beam 12 and end brackets 14 may be replaced by suitable equivalents, such as by welding.

The second end 18 of the bracket body 15 also preferably includes a pair of upper and lower flanges 82, 84, which define the second mouth opening 64 of the bracket body 15. The second mouth opening 64 is configured to receive the frame rail 60 extending from the motor vehicle body (not shown). In particular, the flanges 82, 84 are adapted to cooperate with, preferably, top and bottom walls or surfaces of the frame rail 60 extending from the motor vehicle body (not shown). Preferably, the flanges 82, 84 define a plurality of openings 86 for receiving mechanical fasteners 87 that extend into openings (not shown) in the top and bottom walls or surfaces of the frame rail 60 to secure the end bracket 14 to the frame rail 60 in a conventional manner. The mechanical connection between the end bracket 14 and frame rail 60 may be replaced by suitable equivalents, such as by welding.

The bumper system 10 is assembled and connected to a motor vehicle body (not shown) as generally outlined hereinafter. Initially, the energy-absorbing brackets 14 are first attached to the bumper beam 12 and, in particular, to the bumper beam body 22 with the Σ-shaped cross section 20 received in the first mouth openings 62 defined at the first ends 16 of the bracket bodies 15. The open end or face 30 of the Σ-shaped cross section 20 is received in the mouth openings 62. The flanges 76, 78 thereby cooperate with the top and bottom walls or sides 26, 28 of the bumper beam body 22. The mechanical fasteners 81 may then be inserted into the openings 80 in the flanges 76, 78 and, preferably, corresponding openings (not shown) in the top and bottom walls or sides 26, 28 of the bumper beam body 22 to secure the bumper beam 12 to the end brackets 14. The pole impact protector 40 is preferably pre-attached to the bumper beam body 22 by the methods discussed previously.

The bumper system 10 is now generally configured for connection to the frame rails 60 extending from a motor vehicle body (not shown). In particular, the flanges 82, 84 cooperate with the top and bottom walls or surfaces of the frame rails 60, one of which is illustrated schematically in FIG. 2. In particular, the mechanical fasteners 87 are inserted into the openings 86 in the flanges 82, 84 and preferably corresponding openings (not shown) in the top and bottom walls or surfaces of the frame rails 60 to join the bumper system 10 to the motor vehicle body. In summary, the end brackets 14 are preferably first attached to the bumper beam 12 and the pole impact protector 40 is next attached to the bumper beam 12 to form the bumper system 10. Once the bumper system 10 is formed in this "modular" fashion, the bumper system 10 may be mounted to a motor vehicle body (not shown). The bumpier system 10 may be located at either the front or rear ends of the motor vehicle body.

Referring to FIGS. 9–12, an alternative embodiment of the end brackets 14' of the present invention is shown. In the variation of the end brackets 14' shown in FIGS. 9–12, the bracket body 15' is hollow, tubular and elongated between the first and second ends 16', 18'. Preferably, the bracket body 15' no longer forms a "saddle" shape between the first and second ends 16', 18'. In contrast, the bracket body 15' now generally changes cross sectional shape from the first to the second ends 16', 18', as discussed further herein, which provides the "energy-absorbing" function for the end brackets 14'. Preferably, the second end 18' of the bracket body 15' now has a substantially flat or blunted shape for attaching the end bracket 14' directly to the end of a frame rail (not shown, see FIG. 2). Accordingly, the bracket body 15', preferably does not include the flanges 82, 84 extending from the second end 18 of the bracket body 15 discussed previously. The second end 18' of the bracket body 15' preferably now defines a plurality of openings or holes 88, which are used to secure the end brackets 14' to the frame rails of a motor vehicle body with conventional mechanical fasteners. It will be apparent that the second end 18' may connected directly to the frame rail of a motor vehicle body by other means such as by welding.

The end brackets 14' are intended to cooperate with the bumper beam 12 discussed previously in a similar manner to the end brackets 14 and the discussion of how the end brackets 14 are secured to the bumper beam 12 provided previously is incorporated herein by reference. The end brackets 14' of FIGS. 9–12 are formed in all other respects in a similar manner to the end brackets 14 discussed previously, with the exception of how the end brackets 14' accommodate impact energy by incorporating differing cross sectional shapes along the length of the bracket body 15', as discussed herein.

The bracket body 15' of the end brackets 14' depicted in FIGS. 9–12 is specifically adapted to accommodate large impact forces and, as such, the end brackets 14' are particularly suitable for use at the rear end of motor vehicle bodies. The end brackets 14' make up for the lack of additional structure at the rear end of motor vehicle bodies that is present at the front end of motor vehicle bodies which helps absorb impact energy, such as the engine, drive train, etc.

The bracket body 15' due to its elongated configuration and changing cross sectional shape is adapted to absorb the large impact forces often associated with rear end impacts. The end brackets 14' and, more broadly, the bumper system 10' incorporating the end brackets 14' may be provided at either the front or rear ends of a motor vehicle body. The bumper system 10' incorporating the end brackets 14' illustrated in FIGS. 9–12 is, however, uniquely suited for use at the rear end of a motor vehicle body, as indicated previously.

Figure 12A:
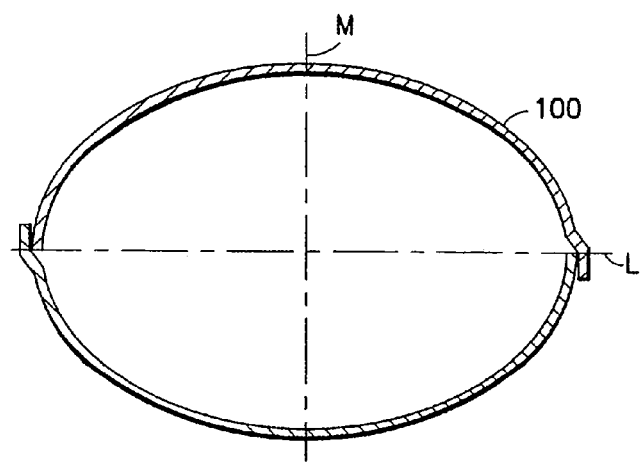
FIGS. 12A–12F are cross sectional views taken along lines 12A—12A through 12F—12F in FIG. 11.
Figure 12B:
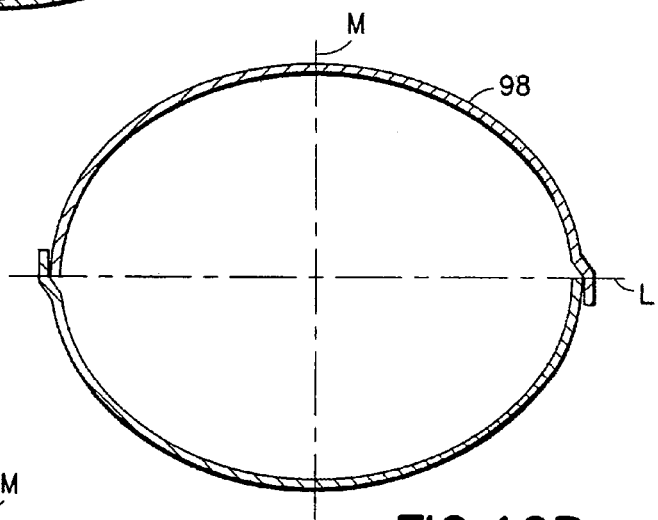
Figure 12C:
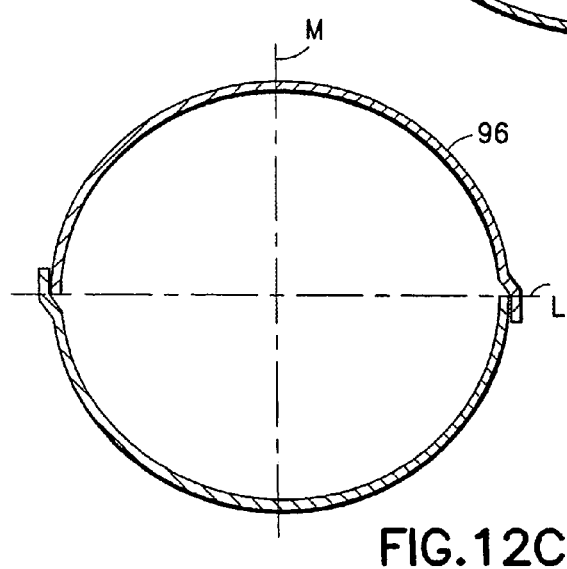
Figure 12D:
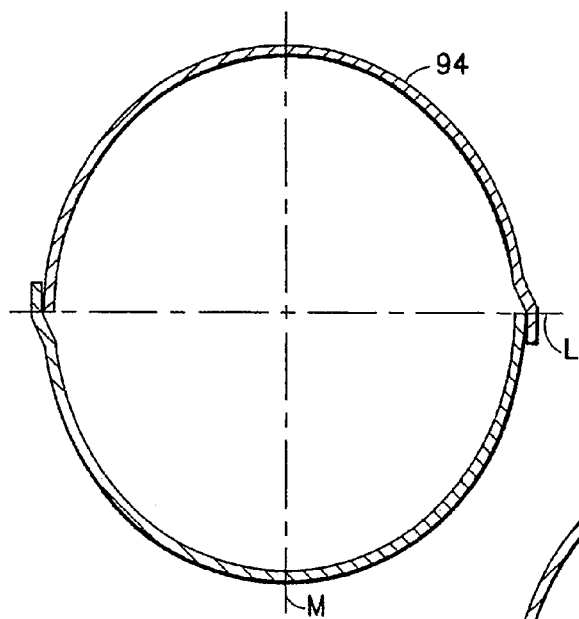
Figure 12E:
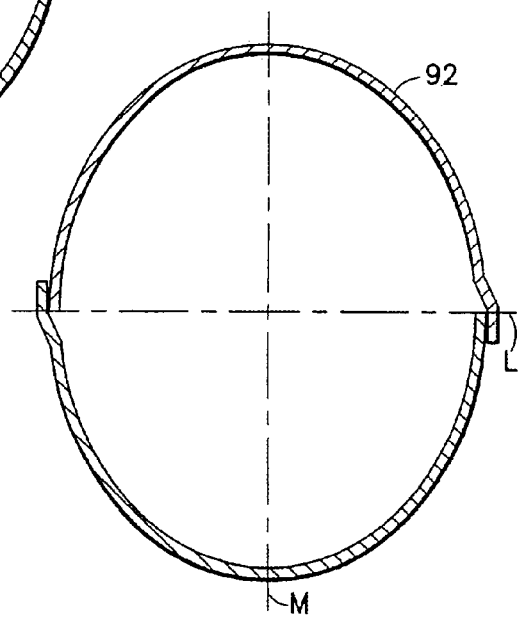

The bracket body 15' accomplishes the foregoing by changing cross sectional shape along the length of the bracket body 15'. In particular, the bracket body 15' changes cross sectional shape from the first end 16' to the second end 18', as illustrated in FIGS. 12A–12F. Thus, in a preferred embodiment of the end brackets 14', the bracket body 15' exhibits a first cross sectional shape 90 at the first end 16' which changes to a different cross sectional shape 100 at the second end 18'. It will be appreciated by those skilled in the art that the first cross sectional shape 90 depicted in FIG. 12A is taken along a line spaced a distance from the first end 16' and that an actual cross section taken exactly at the first end 16' will have a shape substantially similar to the first cross sectional shape 90 shown in FIG. 12A. A similar situation exists with the second cross sectional shape 100 depicted in FIG. 12F and an actual cross section taken through the second end 18' exactly at the second end 18' will have a shape substantially similar to the second cross sectional shape 100 shown in FIG. 12F. For the purposes of this disclosure, the first cross sectional shape 90 depicted in FIG. 12A will be treated as the cross sectional shape of the first end 16' and the second cross sectional shape 100 will be treated as the cross sectional shape of the second end 18' of the bracket body 15'.

Figure 12F:
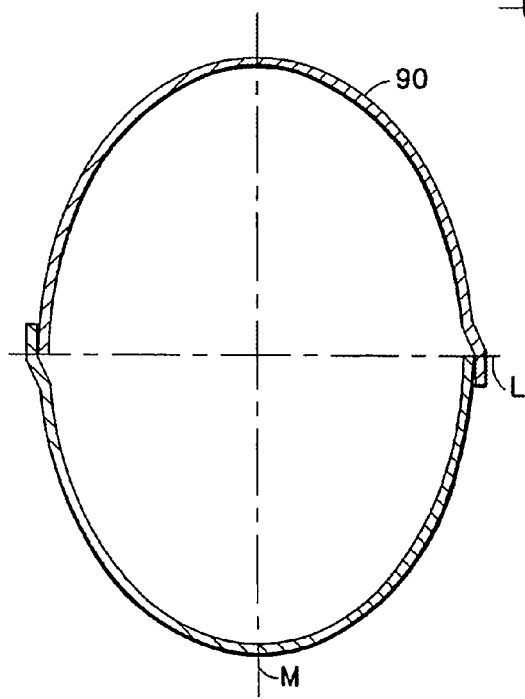

As stated, the bracket body 15' changes cross sectional shape from the first end 16' to the second end 18'. FIGS. 12B–12E show intermediate cross sectional shapes 92, 94, 96, 98 which illustrate the smooth transition of the bracket body 15' from the first end 16' to the second end 18'. As will be appreciated when viewing FIGS. 12A–12F, the first and second cross sectional shapes 90, 100 are both preferably oval-shaped, with the second cross sectional shape 100 rotated about 90° from the first cross sectional shape 92, which makes the second cross sectional shape 100 different from the first cross sectional shape 90. The various intermediate cross sectional shapes 92, 94, 96, 98 illustrate how the overall cross sectional shape of the bracket body 15' changes from the laterally-oriented, elongated oval shape of the first cross sectional shape 90 shown in FIG. 12A to the upright, elongated oval shape of the second cross sectional shape 92 shown in FIG. 12F. As shown in FIG. 12A, the first cross sectional shape 92 is an elongated oval and, in particular, is an elongated oval shape along a first axis L. Similarly, as shown in FIG. 12F, the second cross sectional shape 100 is also an elongated oval but rotated about 90° from the first cross sectional shape and, in particular, the second cross sectional shape 100 is oriented along a second axis M, which is rotated about 90° from the first axis L. The intermediate cross sectional shapes 92, 94, 96, 98 provide for the smooth transition of the first cross sectional shape 92 to the second cross sectional shape 100. The components 70', 72' are preferably formed to provide the smooth transition of the first cross sectional shape 92 to the second cross sectional shape 100.

The oval-to-oval transformation illustrated in FIGS. 12A–12F is a currently preferred configuration for the bracket body 15' in accordance with the present invention. The oval and rotated oval-shape of the first and second ends 16', 18' of the bracket body 15' effectively accommodates impact energy during collisions involving the bumper system 10' incorporating the end brackets 14'. However, the present invention is not limited to the oval and rotated oval-shape of the first and second ends 16', 18' illustrated in FIGS. 12A–12F. Other types of cross sectional shape changes from the first to the second ends 16', 18' are within the scope of the present invention. The general principle illustrated in FIGS. 12A–12F is that the second cross sectional shape 100 at the second end 18' differs from the first cross sectional shape 92 at the first end 16' of the bracket body 15', for example by being rotated about 90° therefrom. This type of cross sectional shape change could take numerous alternative forms. For example, the first cross sectional shape 92 could be polygonal, for example rectangular, and the bracket body 15' could be formed to transition such that the second cross sectional shape 100 is square or triangular-shaped (i.e., polygonal). Additionally, the first cross sectional shape 92 could be oval as shown in FIG. 12A and the bracket body 15' could be formed to transition such that the second cross sectional shape 100 is circular-shaped. Further, the present invention envisions that the first cross sectional shape 92 could be polygonal, for example rectangular, and the bracket body 15' could be formed to transition such that the second cross sectional shape 100 is oval or circular-shaped. Thus, polygonal-to-polygonal, polygonal-to-circular or oval-shaped (and vice versa), and oval to circular-shaped cross sectional shape changes are envisioned by the present invention. FIGS. 12A–12F are provided to show that the second cross sectional shape 100 at the second end 18' differs from the first cross sectional shape 92 at the first end 16' of the bracket body 15', for example by being rotated about 90° therefrom.

The bracket body 15' accommodates impact energy by deforming (i.e., compressing) in the axial direction when the impact forces are applied. Additionally, the differing cross sectional shapes at the first and second ends 16', 18' of the bracket body 15' and the smooth transition therebetween assists in accommodating the impact energy. This is because the differing cross sectional shapes at the first and second ends 16', 18' of the bracket body 15 are "stronger" in different directions. For example, the first cross sectional shape 90 is stronger along the M axis (i.e., shorter axis) while the second cross sectional shape 100 is stronger along the L axis (i.e., shorter axis). The first cross sectional shape 90 is stronger along the M axis to accommodate lateral/horizontal forces acting on the bumper beam 12 during a collision. The second cross sectional shape 100 is stronger along the L axis to accommodate up and down or vertical forces acting on the frame rail of the motor vehicle body during a collision. The elongated cross sectional shapes at the first and second ends 16', 18' of the bracket body 15' are analogous to I-beams which are stronger along their shorter axis than along the longer axis. The unique transition from one cross sectional shape at the first end 16' of the bracket body 15' to a preferably rotated cross sectional shape at the second end 18' of the bracket body 15' effectively accommodates impact energy when the bumper system 10' incorporating the brackets 14' is involved in a collision.

While the present invention was described with reference to preferred embodiments of the bumper system, those skilled in the art may make modifications and alterations to the present invention without departing from the scope and spirit of the invention. Accordingly, the above detailed description is intended to be illustrative rather than restrictive. The invention is defined by the appended claims, and all changes to the invention that fall within the meaning and range of equivalency of the claims are to be embraced within their scope.

The invention claimed is:

1. A bumper system for a motor vehicle, comprising:
a bumper beam; and
an energy-absorbing bracket connected to the bumper beam and adapted for connection to the motor vehicle, the bracket comprising a hollow energy-absorbing body having a generally tubular form with a first end and a second end, the bracket body having a first cross sectional shape at the first end and transitioning to a second cross sectional shape at the second end.

2. The bumper system of claim 1, wherein the second cross sectional shape is different from the first cross sectional shape.

3. The bumper system of claim 1, wherein the first and second cross sectional shapes are substantially identical, with the second cross sectional shape rotated about 90° from the first cross sectional shape.

4. The bumper system of claim 1, wherein the first cross sectional shape is elongated along a first axis and the second cross sectional shape is elongated along a second axis, with the second axis rotated about 90° from the first axis.

5. The bumper system of claim 1, wherein the first and second cross sectional shapes are substantially oval, with the second cross sectional shape rotated about 90° from the first cross sectional shape.

6. The bumper system of claim 1, further comprising opposing flanges extending from the first end of the bracket body and defining a mouth opening receiving the bumper beam.

7. The bumper system of claim 1, wherein the bumper beam has a generally Σ-shaped cross section defined by substantially parallel top and bottom walls connected by a rear wall, the generally Σ-shaped cross section at least partially filled with an impact-absorbing foam material.

8. The bumper system of claim 1, wherein the bumper beam and bracket are formed of different materials.

9. The bumper system of claim 1, wherein the bumper beam and bracket are each formed of aluminum or steel.

10. The bumper system of claim 1, further comprising a pole impact protector connected to the bumper beam on an opposite side of the bumper beam from the bracket.

11. The bumper system of claim 10, wherein the pole impact protector comprises a hollow body defining an outward facing substantially concave surface adapted to accommodate impact energy resulting from a collision with a cylindrical object.

12. The bumper system of claim 11, wherein the pole impact protector body is at least partially filled with an impact-absorbing foam material.

13. The bumper beam of claim 11, wherein the pole impact protector body is formed of aluminum or steel.

14. An energy-absorbing bracket for use in a bumper system of a motor vehicle, comprising a hollow energy-absorbing body having a generally tubular form with a first end and a second end, the bracket body having a first cross sectional shape at the first end and transitioning to a second cross sectional shape at the second end for accommodating impact energy during a collision involving the motor vehicle.

15. The energy-absorbing bracket of claim 14, wherein the second cross sectional shape is different from the first cross sectional shape.

16. The energy-absorbing bracket of claim 14, wherein the first and second cross sectional shapes are substantially identical, with the second cross sectional shape rotated about 90° from the first cross sectional shape.

17. The energy-absorbing bracket of claim 14, wherein the first cross sectional shape is elongated along a first axis and the second cross sectional shape is elongated along a second axis, with the second axis rotated about 90° from the first axis.

18. The energy-absorbing bracket of claim 14, wherein the first and second cross sectional shapes are substantially oval, with the second cross sectional shape rotated about 90° from the first cross sectional shape.

19. The energy-absorbing bracket of claim 14, further comprising opposing flanges extending from the first end of the bracket body and defining a mouth opening adapted to receive a bumper beam of the motor vehicle.

20. The energy-absorbing bracket of claim 14 wherein the bracket body is formed of aluminum or steel.

21. A pole impact protector for use in a bumper system of a motor vehicle, comprising a hollow body having a closed end defining an outward facing substantially concave surface adapted to accommodate impact energy resulting from a collision with a vertically oriented cylindrical object.

22. The pole impact protector of claim 21, the pole impact protector body comprising an open end opposite the closed end, and further comprising opposing flanges extending from the open end for mounting the pole impact protector to the bumper system.

23. The pole impact protector of claim 21, wherein the pole impact protector body is at least partially filled with an impact-absorbing foam material.

24. The pole impact protector of claim 21, wherein the pole impact protector body is formed of aluminum or steel.

25. A method of assembling and attaching a bumper system to a motor vehicle, comprising:
providing an energy-absorbing bracket comprising a hollow energy-absorbing body having a generally tubular form with a first end and a second end, the bracket comprising a hollow energy-absorbing body having a first end and a second end, the bracket body having a first cross sectional shape at the first end and transitioning to a second cross sectional shape at the second end, the bracket body further comprising opposing flanges at least at the first end of the bracket body, the opposing flanges defining a mouth opening; and
receiving and securing a bumper beam in the mouth opening at the first end of the bracket body.

26. The method of claim 25, further comprising attaching the second end of the bracket body to the motor vehicle.

27. The method of claim 25, further comprising attaching a pole impact protector to the bumper beam on an opposite side of the bumper beam from the bracket.

28. The method of claim 27, wherein the pole impact protector comprises a hollow body having a closed end and an open end, the pole impact protector body further comprising opposing flanges extending from the open end, wherein the step of attaching the pole impact protector to the bumper beam comprises receiving the bumper beam between the opposing flanges of the pole impact protector body and securing the flanges to the bumper beam.

* * * * *